(12) United States Patent
Hwang et al.

(10) Patent No.: US 8,581,603 B2
(45) Date of Patent: Nov. 12, 2013

(54) OCCUPANT CLASSIFYING DEVICE FOR AN AUTOMOBILE

(75) Inventors: Jae Ho Hwang, Seongnam-si (KR); You Tae Park, Seoul (KR); Young Soo Hwang, Suwon-si (KR); Byung Hyuk Park, Yongin-si (KR)

(73) Assignee: Hyundai Mobis Co., Ltd, Yongin-Si, Gyeonggi-Do (KR)

( * ) Notice: Subject to any disclaimer, the term of this patent is extended or adjusted under 35 U.S.C. 154(b) by 695 days.

(21) Appl. No.: 12/763,487

(22) Filed: Apr. 20, 2010

(65) Prior Publication Data

US 2011/0221453 A1 Sep. 15, 2011

(30) Foreign Application Priority Data

Mar. 12, 2010 (KR) .................. 10-2010-0022320

(51) Int. Cl.
  *G01R 27/26* (2006.01)
  *G01D 5/241* (2006.01)
(52) U.S. Cl.
  CPC .................... *G01D 5/2417* (2013.01)
  USPC .......................................... 324/661; 324/658
(58) Field of Classification Search
  None
  See application file for complete search history.

(56) References Cited

U.S. PATENT DOCUMENTS

| 5,770,997 A * | 6/1998 | Kleinberg et al. ............. 340/438 |
| 6,283,504 B1 * | 9/2001 | Stanley et al. ................ 280/735 |
| 7,202,674 B2 * | 4/2007 | Nakano et al. ................ 324/661 |
| 2010/0295563 A1 * | 11/2010 | Bieck et al. .................... 324/679 |

FOREIGN PATENT DOCUMENTS

| EP | 2036780 A1 * | 3/2009 |
| JP | 2000-075044 A | 3/2000 |
| JP | 2000-306462 A | 11/2000 |
| JP | 2003-048471 | 2/2003 |
| JP | 2003121557 A * | 4/2003 |
| KR | 10-2011-0006087 | 1/2011 |

* cited by examiner

*Primary Examiner* — Paresh Patel
(74) *Attorney, Agent, or Firm* — Sherr & Jiang, PLLC

(57) ABSTRACT

Provided is an occupant classifying device which can detect an occupant sitting on a seat by a change in an electric field between first and second electrodes that is caused by the occupant sitting on the seat. The occupant classifying device includes: a seat for an occupant to sit on; a first electrode disposed in the seat; a second electrode disposed in the seat, spaced apart from the first electrode, and forming an electric field between the first and second electrodes; and a current measuring device for measuring a variation in current value corresponding to changes in the electric field caused by the occupant sitting on the seat.

18 Claims, 10 Drawing Sheets

OCCUPANT CLASSIFYING DEVICE FOR AN AUTOMOBILE

CROSS REFERENCE TO PRIOR APPLICATIONS

This application claims priority to Korean Patent Application No. 10-2010-0022320 (filed on Mar. 12, 2010), under 35 U.S.C. §119, which are hereby incorporated by reference in its entirety.

BACKGROUND OF THE INVENTION

1. Field of the Invention

The present invention relates to an occupant classifying device, and more particularly, to an occupant classifying device in which first and second electrodes forming an electric field acting there between are all disposed in a seat in order to detect an occupant sitting in the seat.

2. Discussion of the Related Art

In general, cars are provided with various safety devices for ensuring the safety of occupants. One example of these safety devices is an airbag which protects an occupant by being inflated between a vehicle structure and the occupant when the vehicle collides.

Such an airbag is deployed when a car collision occurs, thus protecting car occupants. In the case of an adult, there is no problem when using an airbag, but in the case of an infant, a deployed airbag may act as a dangerous factor that threatens the life thereof.

Accordingly, each country has guidelines for testing the actual safety of an assistant driver's seat upon deployment of an airbag. To satisfy these guidelines, an occupant detection sensor is provided in an assistant driver's seat to classify an occupant sitting on the seat as an infant, an adult, etc., whereby the deployment or not of an airbag for an occupant seat and the deployment conditions of the airbag are determined differently.

SUMMARY OF THE INVENTION

It is an object of the present invention to provide an occupant classifying device which can improve sensitivity by having first and second electrodes all disposed in a seat, requires no insulating body to be installed in the seat, can clearly distinguish between an infant and an adult, and can minimize the effects of a mobile phone, moisture, and a seat heater.

To achieve the above object, the present invention provides an occupant classifying device including: a seat for an occupant to sit on; a first electrode disposed in the seat; a second electrode disposed in the seat, spaced apart from the first electrode, and forming an electric field between the first and second electrodes; and a current measuring device for measuring a variation in current value corresponding to changes in the electric field caused by the occupant sitting on the seat.

The occupant classifying device according to the present invention can increase the intensity of an electric field formed between a first electrode and a second electrode and prevent the electric field from spreading in all directions because the first and second electrodes are all disposed in a seat, thereby improving sensitivity and requiring no insulating body to be installed in the seat.

Moreover, it is possible to minimize scattering of the electric field generated between the first and second electrodes due to interference with electromagnetic waves generated from electronic equipment because a position where the electric field is formed is limited to a seat, thereby improving sensitivity.

Further, it is possible to clearly distinguish between an infant and an adult because of a large difference between a capacitance for an infant and a capacitance for an adult.

In addition, in the case that a mobile phone is on the seat, or the seat is wet with water, or a seat heater for heating the seat is disposed inside or on the seat, it is possible to minimize the effects of the mobile phone, water, and seat heater that disturb the classification of occupants.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENT

Hereinafter, an occupant classifying device according to exemplary embodiments of the present invention will be described in detail with reference to the accompanying drawings.

[First Exemplary Embodiment]

Figure 1:
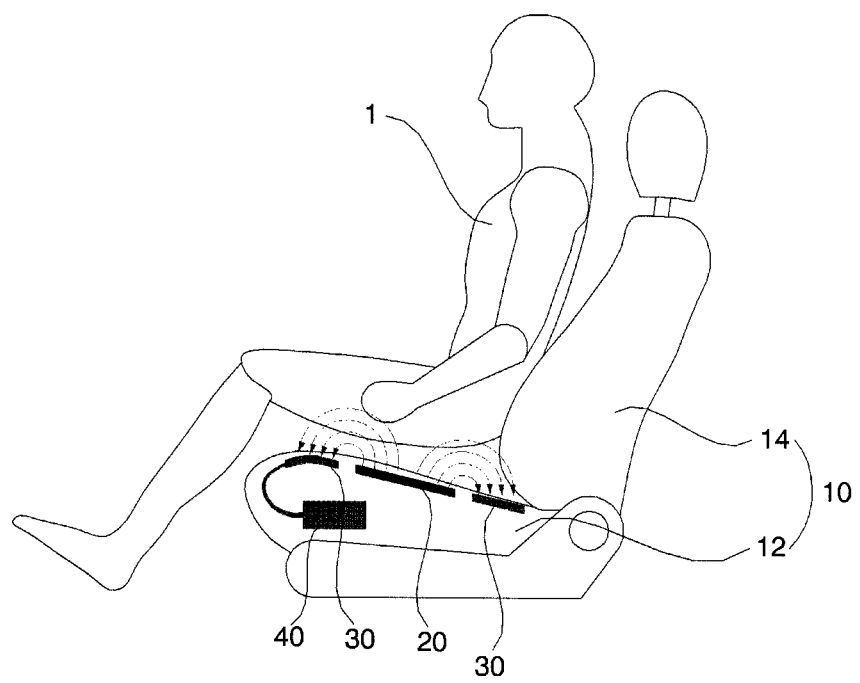
FIG. 1 is a conceptual view illustrating main parts of an occupant classifying device according to a first exemplary embodiment of the present invention.
Figure 2:
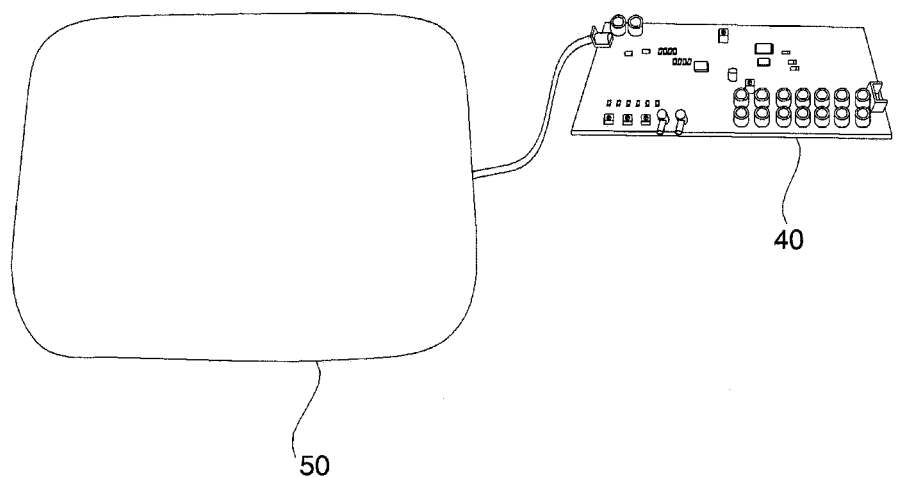
FIG. 2 is a view illustrating first and second electrodes shown in FIG. 1 being embedded in a sensor mat.
Figure 3:
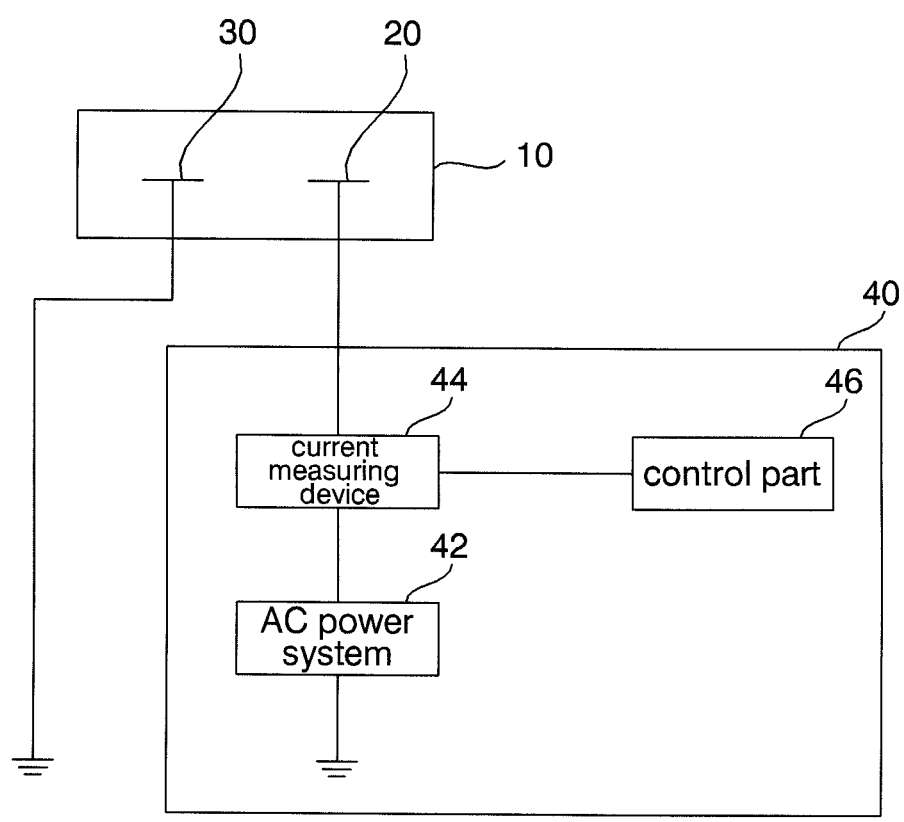
FIG. 3 is a block diagram of FIG. 1.
Figure 4:
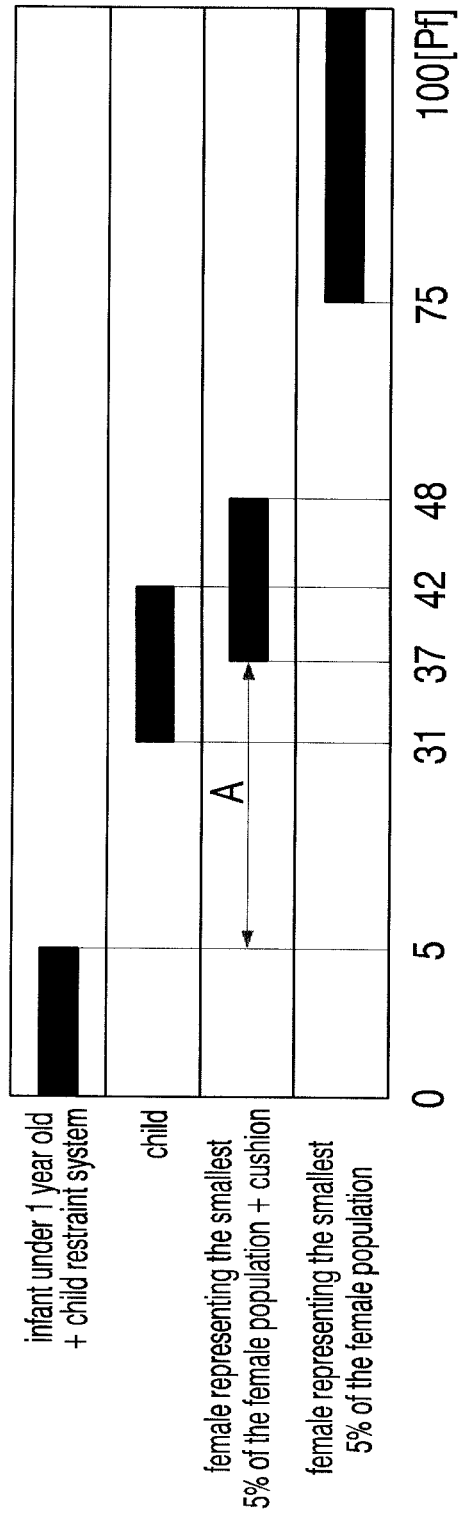
FIG. 4 is a graph showing variations in capacitance according to the classification of occupants in the occupant classifying device according to the first exemplary embodiment of the present invention.
Figure 5:
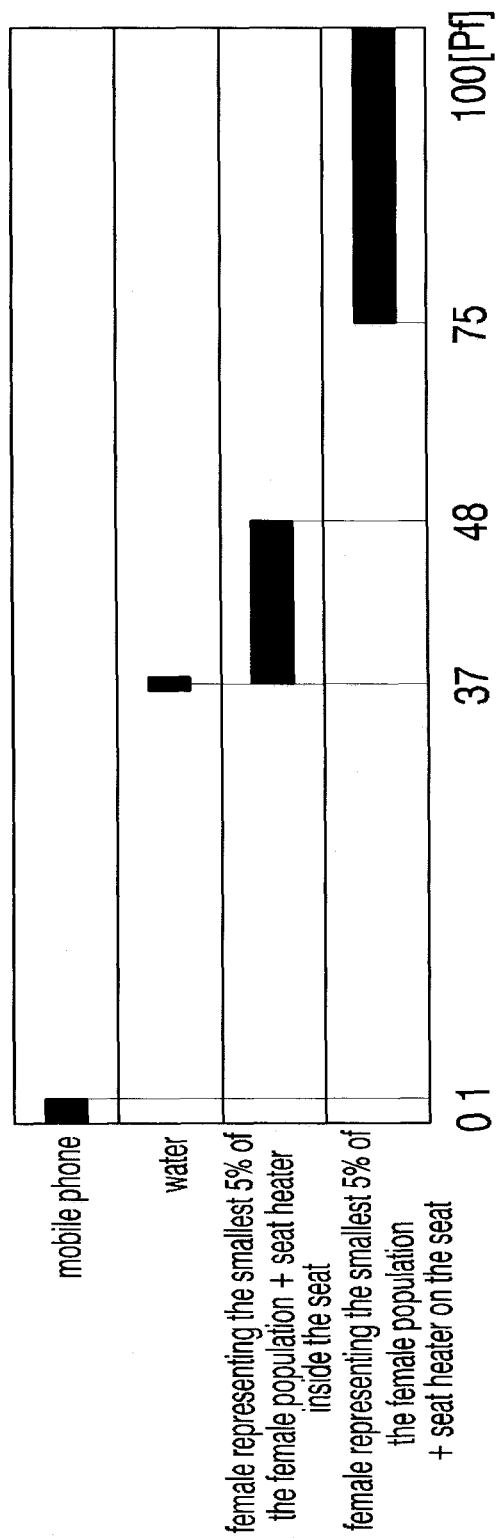
FIG. 5 is a graph showing variations in capacitance caused by external factors of the occupant classifying device according to the first exemplary embodiment of the present invention.
Figure 6:
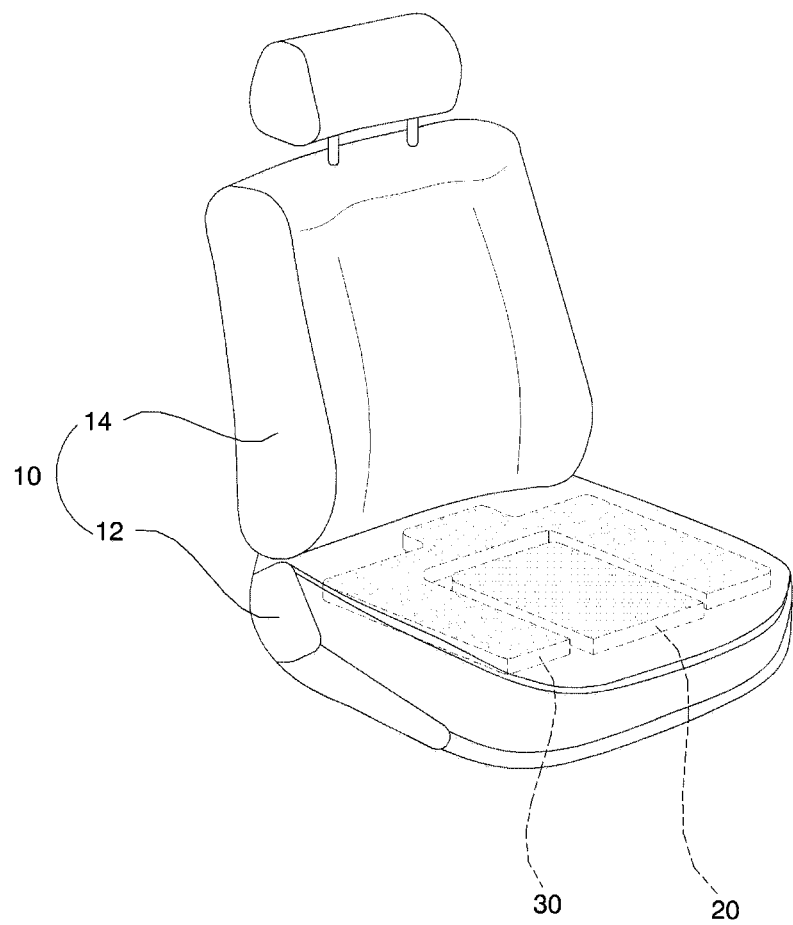
FIG. 6 is a view showing the first and second electrodes of the occupant classifying device according to the first exemplary embodiment of the present invention being installed in the seat.

FIG. 1 is a conceptual view illustrating main parts of an occupant classifying device according to a first exemplary embodiment of the present invention, FIG. 2 is a view illustrating first and second electrodes shown in FIG. 1 being embedded in a sensor mat, FIG. 3 is a block diagram of FIG. 1, FIG. 4 is a graph showing variations in capacitance according to the classification of occupants in the occupant classifying device according to the first exemplary embodiment of the present invention, FIG. 5 is a graph showing variations in capacitance caused by external factors of the occupant classifying device according to the first exemplary embodiment of the present invention, and FIG. 6 is a view showing the first and second electrodes of the occupant classifying device according to the first exemplary embodiment of the present invention being installed in the seat.

Referring to FIG. 1, the occupant classifying device according to the first exemplary embodiment of the present invention comprises a seat 10 for an occupant 1 to sit on, a first electrode 20 disposed in the seat 10, a second electrode 30 disposed in the seat 10, spaced apart from the first electrode 20, and a control unit 40 electrically connected to the first electrode 20 and the second electrode 30.

The seat 10 comprises a sitting portion 12 on which the buttocks of the occupant 1 rest and a seatback 14 for supporting the back of the occupant 1.

The first electrode 20 and the second electrode 30 may be disposed in the sitting portion 12 of the seat 10 or in the seatback 14 thereof. In the following description, the first electrode 10 and the second electrode 20 are constrained to be disposed in the sitting portion 12 of the seat 10, and the seat 10 indicates the sitting portion 12.

Referring to FIG. 2, the first electrode 20 and the second electrode 30 may be embedded in a sensor mat 50, wired as a module on the control unit 40, and installed within the seat 10. With the first and second electrodes 20 and 30 being provided as a module, assemblability can be improved compared with the first and second electrodes 20 and 30 installed directly within the seat 10. Thus, it is preferable that the first electrode 20 and the second electrode 30 are installed within the seat 10, embedded within the sensor mat 50. Hereinafter, a description of the sensor mat 50 is omitted.

The first electrode 20 receives AC power from the control unit 40, and the second electrode 30 is grounded to the automobile body. Of course, it is also possible that the first electrode 20 is grounded to the automobile body and the second electrode 30 receives AC power from the control unit 40. The following description will be given with respect to the case where the first electrode 20 receives AC power from the control unit 40 and the second electrode 30 is grounded to the automobile body.

When AC power is applied to the first electrode 20, the first electrode 20 and the second electrode 30 alternately act as a positive (+) electrode and a negative (−) electrode to form an electric field between the first electrode 20 and the second electrode 30.

In general, the intensity of the electric field is inversely proportional to the square of the distance between the first electrode 20 and the second electrode 30 according to Coulomb's law. Therefore, the closer the first electrode 20 and the second electrode 30 to each other, the higher the intensity of the electric field. Thus, sensitivity for detecting the occupant 1 can be improved.

Moreover, the longer the distance between the first electrode 20 and the second electrode 30 is, the more the electric field spreads in all directions. Thus, sensitivity can be lowered because only a part of the electric field is involved in detecting the occupant 1. Accordingly, an insulating body is installed in the seat 10 so as to prevent the electric field from spreading in all directions in case the distance between the first electrode 20 and the second electrode 30 is long. However, such an insulating body may be omitted in the occupant classifying device according to the first exemplary embodiment of the present invention since the first electrode 20 and the second electrode 30 are all disposed close to each other in the seat 10.

Further, since the electric field formed between the first electrode 20 and the second electrode 30 is limited to the seat 10, this makes it possible to minimize the scattering of the electric field generated between the first and second electrodes 20 and 30 due to interference with electromagnetic waves generated from electronic equipment, thereby improving sensitivity.

It is desirable that the first electrode 20 and the second electrode 30 be disposed on the same plane so as to be close to each other. In this exemplary embodiment, the first electrode 20 and the second electrode 30 are illustrated as being disposed in parallel to the upper surface of the seat 10.

Referring to FIG. 3, the control unit 40 comprises an AC power system 42 for applying AC power to the first electrode 20, a current measuring device 44 for measuring a variation in current value I corresponding to changes in the electric field formed between the first electrode 20 and the second electrode 30 by the occupant 1 sitting on the seat 10, and a control part 46 for classifying the occupant 1 based on the current value I measured by the current measuring device 44.

The current value I varies with changes in the electric field formed between the first electrode 20 and the second electrode 30. That is, the current value I varies with the permittivity of an object between the first electrode 20 and the second electrode 30.

Typically, the permittivity of air is approximately 1, the permittivity of water is 80, the permittivity of moisture (gas) is 1, the permittivity of ice is 100, and the permittivity of plastic is 2 to 3, respectively. Accordingly, as can be seen from [Equation 1], the capacitance C between the first electrode 20 and the second electrode 30 varies with the permittivity of the object between the first electrode 20 and the second electrode 30.

$$\varepsilon \frac{A}{d} \qquad \text{[Equation 1]}$$

where C is capacitance, $\varepsilon$ is permittivity, A is the sum of the areas of the first and second electrodes 20 and 30, and d is the distance between the first electrode 20 and the second electrode 30.

The control part 46 is able to calculate the capacitance C by the following [Equation 2]:

$$I = C \frac{dV}{dt} \qquad \text{[Equation 2]}$$

where I is a current value measured by the current measuring device 44, C is capacitance, and V is a voltage applied from the AC power system. That is, the current value I measured by the current measuring device 44 is equal to a value obtained by multiplying a value, obtained by differentiating the voltage V applied from the AC power system 42 with a time constant, by the capacitance C between the first and second electrodes 20 and 30.

The control part 46 compares the capacitance C calculated using the current value I measured by the current measuring device 44 with capacitance preset in the control part 46.

The values of capacitance preset in the control part 46 are values determined by an experiment, and these values are depicted in FIG. 4.

Referring to FIG. 4, it can be seen that the capacitance C between the first electrode 20 and the second electrode 30 have various values according to the presence or absence of the occupant 1 and the type of the occupant 1.

If the seat 10 is empty, the capacitance C between the first electrode 20 and the second electrode 30 is set to 0 petafarad (Pf), and if a child restraint system (CRS) on which an infant under 1 year old is seated is mounted on the seat 10, or a child sits on the seat 10, or a female representing the smallest 5% of the female population sits on the seat 10 with a cushion under her buttocks, or a female representing the smallest 5% of the female population sits on the seat 10, the capacitance C between the first electrode 20 and the second electrode 30 is converted into percentage.

More specifically, if the child restraint system on which an infant under 1 year old is seated is mounted on the seat 10, the capacitance C between the first electrode 20 and the second electrode 30 has a value of 5 or less, if a child sits on the seat 10, the capacitance C has a value of 31 to 42, if a female representing the smallest 5% of the female population sits on the seat 10 with a cushion under her buttocks, the capacitance C has a value of 37 to 48, and if a female representing the smallest 5% of the female population sits on the seat 10, the capacitance C has a value of 75 to 100.

As can be seen from the values of the capacitance C between the first electrode 20 and the second electrode 30 caused by the occupant 1 sitting on the seat 10, the occupant classifying device according to the first exemplary embodiment of the present invention exhibits a difference A of 32 between the capacitance of an adult and the capacitance of an infant. That is, the difference between the lowest value of 37 of the female representing the smallest 5% of the female population, who is an adult, and the highest value of 5 of the infant is 32. Accordingly, since the difference A between the values of capacitance for distinguishing between an infant and an adult is relatively large, this allows clear distinguishing between an infant and an adult.

By comparing the capacitance C calculated using the current value I measured by the current measuring device 44 with the capacitance preset in the control part 46 shown in FIG. 4, the control part 46 can distinguish whether the seat 10 is empty, or the occupant 1 sitting on the seat 10 is an infant under 1 year old, a child, or a female representing the smallest 5% of the female population according to a result of comparison.

Therefore, the control part 46 can control such that, when the seat 10 is empty or the occupant 1 sitting on the seat 10 is classified as an infant under 1 year old, a child, or a female representing the smallest 5% of the female population, the airbag may not be deployed, or even if deployed, the airbag may be deployed at low pressure.

Meanwhile, referring to FIG. 5, if the seat 10 is empty, the capacitance C between the first electrode 20 and the second electrode 30 is set to 0 petafarad (Pf), and if a mobile phone is on the seat 10, the seat 10 is wet with water, a female representing the smallest 5% of the female population sits on the seat 10 with a seat heater for heating the seat 10 being disposed inside the seat 10, or a female representing the smallest 5% of the female population sits on the seat 10 with the seat heater being disposed on the seat 10, the capacitance C between the first electrode 20 and the second electrode 30 is converted into percentage.

More specifically, if the mobile phone is on the seat 10, the capacitance C between the first electrode 20 and the second electrode 30 has a value of 1 or less, if the seat 10 is wet with water, the capacitance C has an approximate value of 37, if a female representing the smallest 5% of the female population sits on the seat 10 with a seat heater for heating the seat 10 being disposed inside the seat 10, the capacitance C has a value of 37 to 48, and if a female representing the smallest 5% of the female population sits on the seat 10 with the seat heater being disposed on the seat 10, the capacitance C has a value of 75 to 100.

Incidentally, when comparing the graphs of FIGS. 4 and 5, the values of capacitance shown in FIG. 5 are values which lie within the values of capacitance C preset in the control part 46 shown in FIG. 4. Therefore, even if a mobile phone is on the seat 10, or the seat 10 is wet with water, or a seat heater is disposed in the seat 10, this does not affect the values of the capacitance preset in the control part 46. That is, the occupant classifying device according to the first exemplary embodiment of the present invention can minimize the effects of the mobile phone, moisture, and seat heater. Especially, the values of capacitance, which are obtained when a female representing the smallest 5% of the female population sits on the seat 10 with a seat heater for heating the seat 10 being disposed inside or on the seat 10, are almost equal to the values of capacitance shown in FIG. 4, which are obtained when a female representing the smallest 5% of the female population sits on the seat 10 with or without a cushion under her buttocks. As such, the occupant classifying device according to the first exemplary embodiment of the present invention can minimize the effects of particularly the seat heater, so there is no need to install a shield (not shown) between the first and second electrodes 20 and 30 and the seat heater in order to prevent the seat heater from affecting the electric field formed between the first and second electrodes 20 and 30.

Referring to FIG. 6, the second electrode 30 of the occupant classifying device according to the first exemplary embodiment of the present invention is made of a plate-like body, and has a substantially U-shape with an opened portion facing the front of the seat 10. Also, the first electrode 20 is made of a plate-like body and is inserted into the opened portion of the second electrode 30. Of course, it may also be possible that the first electrode 20 has an opened portion facing the front of the seat 10 and the second electrode 30 is inserted into the opened portion of the first electrode 20.

Moreover, the opened portion of the second electrode 30 may be disposed to face the front of the seat 10, the rear of the seat 10, the left side of the seat 10, and the right side of the seat 10.

The following description will be made with respect to the case where the second electrode 30 is opened at the portion facing the front of the seat 10 and the first electrode 20 is inserted into the opened portion of the second electrode 30.

The first electrode 20 is smaller in size than the opened portion of the second electrode 30 so that the first electrode 20 is inserted into the opened portion of the second electrode 30 and spaced apart from the second electrode 30.

Since the first electrode 20 and the second electrode 30 extend over the seat 10 in the above-mentioned manner with the space therebetween, even when the occupant 1 sits leaning to one side of the seat 10, the occupant 1 can be in contact with the electric field formed between the first electrode 20 and the second electrode 30, so that the occupant 1 sitting on the seat 10 can be detected.

[Second Exemplary Embodiment]

Figure 7:
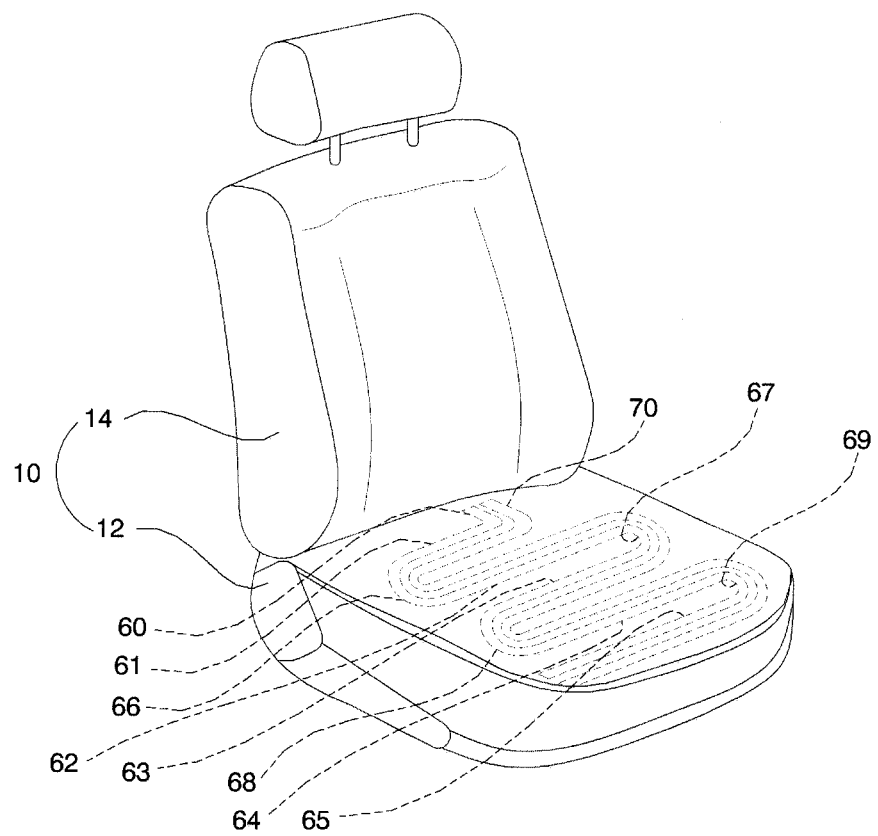
FIG. 7 is a view showing first and second electrodes of an occupant classifying device being installed in a seat according to a second exemplary embodiment of the present invention.

FIG. 7 is a view showing first and second electrodes of an occupant classifying device being installed in a seat according to a second exemplary embodiment of the present invention. Descriptions of the same parts as the foregoing first exemplary embodiment will be omitted, and only the differences will be described.

Referring to FIG. 7, it can be seen that a first electrode 60 and a second electrode 70 of the occupant classifying device according to the second exemplary embodiment of the present invention are different from those of the foregoing first exemplary embodiment.

That is, the first electrode 60 and the second electrode 70 are made of wires, and disposed extending from the rear of the seat 10 to the front thereof. Of course, the first electrode 60 and the second electrode 70 may be disposed extending from the front of the seat 10 to the rear thereof, disposed extending from the left side of the seat 10 to the right side thereof, or disposed extending from the right side of the seat 10 to the left side thereof. The following description will be made with respect to the first electrode 60 and the second electrode 70 being disposed extending from the rear of the seat 10 to the front thereof.

The first electrode 60 comprises a plurality of horizontal portions 61, 62, 63, 64, and 65 disposed in parallel in the left-right directions of the seat 10 and bent portions 66, 67, 68, and 69 connecting the neighboring horizontal portions 61, 62, 63, 64, and 65 while moving alternately between the left and right sides of the plurality of horizontal portions 61, 62, 63, 64, and 65.

The number of the bent portions 66, 67, 68, and 69 is 1 less than the number of the horizontal portions 61, 62, 63, 64, and 65. That is, if there are two horizontal portions 61 and 62, one bent portion 66 is formed to connect the left or right sides of the horizontal portions 61 and 62. Also, if there are three horizontal portions 61, 62, and 63, two bent portions 66 and 67 are formed such that one 66 of the two bent portions connects the left or right sides of the horizontal portions 61 and 62 and the other one 67 connects the right or left sides of the horizontal portions 62 and 63 that have not been connected.

If one bent portion 66 is formed, the bent portion 66 is disposed adjacent to the left or right side of the seat 10. On the other hand, if two bent portions 66 and 67 are formed, one 66 of them is disposed adjacent to the left side of the seat 10 and the other one 67 is disposed adjacent to the right side of the seat 10. Also, if three or more bent portions 66, 67, 68, and 69 are formed, they are disposed adjacent to each other while moving alternately between the left and right sides of the seat 10.

Moreover, the second electrode 70 has the same shape as the first electrode 60, and is disposed along the first electrode 60.

Since the first electrode 60 and the second electrode 70 extend over the seat 10 in the above-mentioned manner, even when the occupant 1 sits leaning to one side of the seat 10, the occupant 1 can be in contact with the electric field formed between the first electrode 60 and the second electrode 70, so that the occupant 1 sitting on the seat 10 can be detected.

[Third Exemplary Embodiment]

Figure 8:
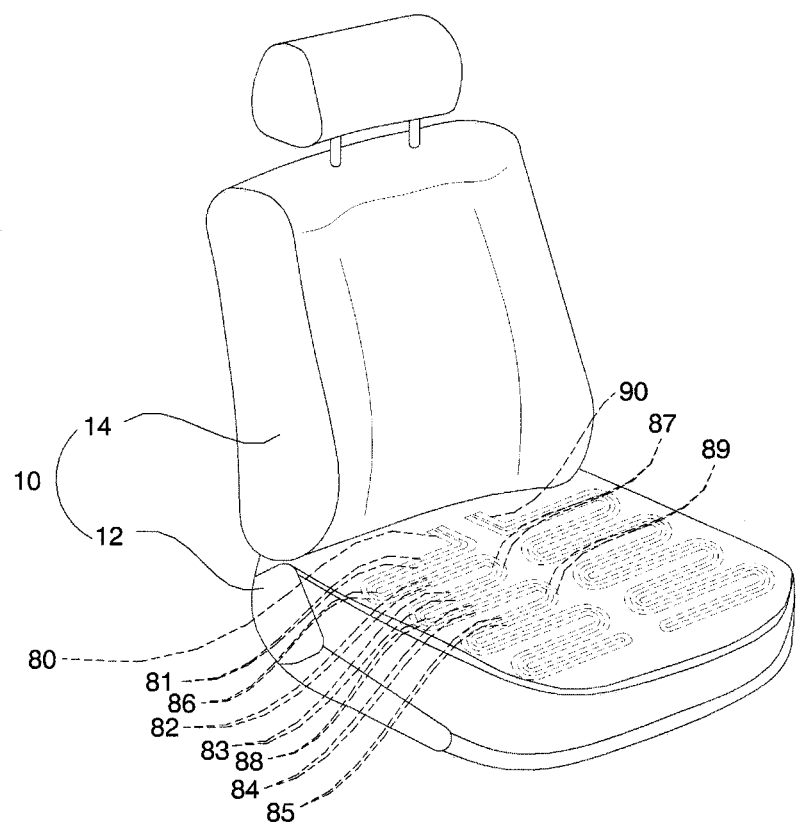
FIG. 8 is a view showing first and second electrodes of an occupant classifying device being installed in a seat according to a third exemplary embodiment of the present invention.

FIG. 8 is a view showing first and second electrodes of an occupant classifying device being installed in a seat according to a third exemplary embodiment of the present invention. Descriptions of the same parts as the foregoing exemplary embodiments will be omitted, and only the differences will be described.

Referring to FIG. 8, it can be seen that a first electrode 80 and a second electrode 90 of the occupant classifying device according to the third exemplary embodiment of the present invention are different from those of the foregoing exemplary embodiments.

That is, the first electrode 80 and the second electrode 90 are made of wires, and disposed extending from the rear of the seat 10 to the front thereof. Of course, the first electrode 80 and the second electrode 90 may be disposed extending from the front of the seat 10 to the rear thereof, disposed extending from the left side of the seat 10 to the right side thereof, or disposed extending from the right side of the seat 10 to the left side thereof.

Moreover, the first electrode 80 is disposed at the left side of the seat 10, and the second electrode 90 is disposed at the right side of the seat 10. Of course, it may also be possible that the first electrode 80 is disposed at the right side of the seat 10 and the second electrode 90 is disposed at the left side of the seat 10.

The following description will be made with respect to the case where the first electrode 80 and the second electrode 90 are disposed extending from the rear of the seat 10 to the front thereof, and the first electrode 80 is disposed at the left side of the seat and the second electrode 90 is disposed at the right side of the seat 10.

The first electrode 80, whose center is bent so that both ends thereof are symmetrical to each other, comprises a plurality of horizontal portions 81, 82, 83, 84, and 85 disposed in parallel in the left-right directions of the seat 10, spaced apart from each other, and bent portions 86, 87, 88, and 89 connecting the neighboring horizontal portions 81, 82, 83, 84, and 85 while moving alternately between the left and right sides of the plurality of horizontal portions 81, 82, 83, 84, and 85.

The number of the bent portions 86, 87, 88, and 89 is 1 less than the number of the horizontal portions 81, 82, 83, 84, and 85. That is, if there are two horizontal portions 81 and 82, one bent portion 86 is formed to connect the left or right sides of the horizontal portions 81 and 82. Also, if there are three horizontal portions 81, 82, and 83, two bent portions 86 and 87 are formed such that one 86 of the two bent portions connects the left or right sides of the horizontal portions 81 and 82 and the other one 87 connects the right or left sides of the horizontal portions 82 and 83 that have not been connected.

If one bent portion 86 is formed, the bent portion 86 is disposed adjacent to the left or right side of the seat 10. On the other hand, if two bent portions 86 and 87 are formed, one 86 of them is disposed adjacent to the left side of the seat 10 and the other one 87 is disposed adjacent to the center of the seat 10. Also, if three or more bent portions 86, 87, 88, and 89 are formed, they are disposed adjacent to each other while moving alternately between the left side and center of the seat 10.

Moreover, the second electrode 90 has the same shape as the first electrode 80, and is disposed along the first electrode 80.

[Fourth Exemplary Embodiment]

Figure 9:
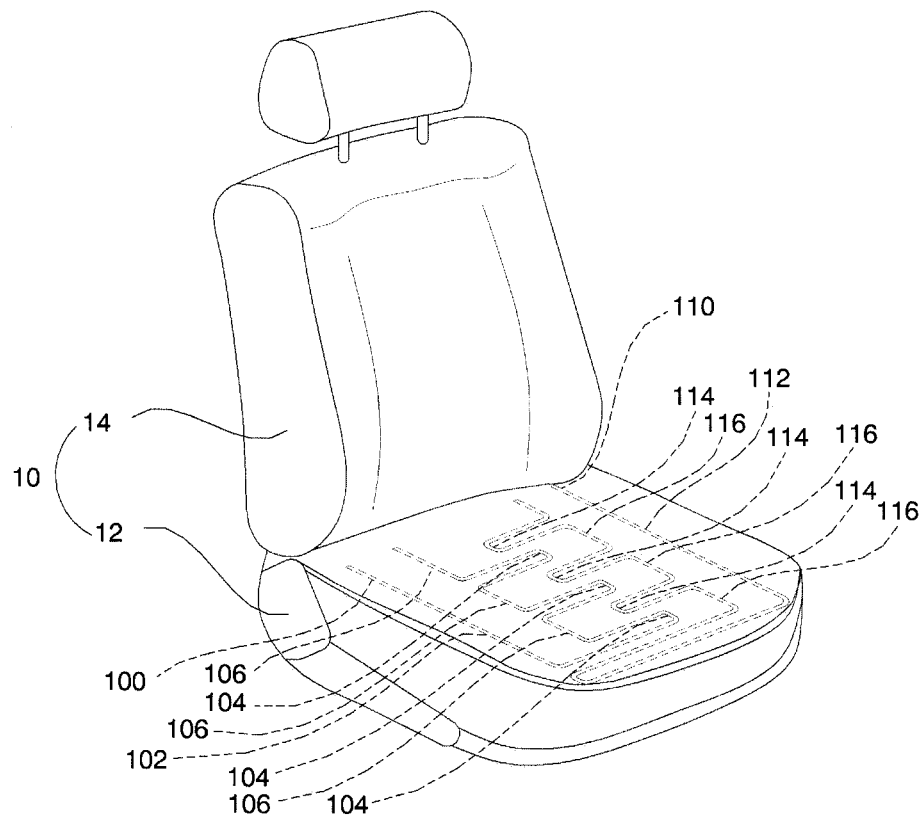
FIG. 9 is a view showing first and second electrodes of an occupant classifying device being installed in a seat according to a fourth exemplary embodiment of the present invention.

FIG. 9 is a view showing first and second electrodes of an occupant classifying device being installed in a seat according to a fourth exemplary embodiment of the present invention. Descriptions of the same parts as the foregoing exemplary embodiments will be omitted, and only the differences will be described.

Referring to FIG. 9, it can be seen that a first electrode 100 and a second electrode 110 of the occupant classifying device according to the fourth exemplary embodiment of the present invention are different from those of the foregoing exemplary embodiments.

That is, the first electrode 100 and the second electrode 110 are made of wires, and disposed extending from the rear of the seat 10 to the front thereof. Of course, the first electrode 100 and the second electrode 110 may be disposed extending from the front of the seat 10 to the rear thereof, disposed extending from the left side of the seat 10 to the right side thereof, or disposed extending from the right side of the seat 10 to the left side thereof.

Moreover, the first electrode 100 is disposed at the left side of the seat 10, and the second electrode 110 is disposed at the right side of the seat 10. Of course, it may also be possible that the first electrode 100 is disposed at the right side of the seat 10 and the second electrode 110 is disposed at the left side of the seat 10.

The following description will be made with respect to the case where the first electrode 100 and the second electrode 110 are disposed extending from the rear of the seat 10 to the front thereof, and the first electrode 100 is disposed at the left side of the seat 10 and the second electrode 110 is disposed at the right side of the seat 10.

The first electrode 100 comprises a first linear portion 102 extending straight from the rear of the seat 10 to the front thereof and a first projection 104 and a first recess 106 bent a plurality of times in the left-right direction of the seat 10 from the first linear portion 102 and formed alternately to each other.

The first projection 104 and the first recess 106 may be formed in a plural number extending from the front of the seat 10 to the rear thereof.

Also, the second electrode 110 comprises a second linear portion 112 extending straight from the rear of the seat 10 to the front thereof and a second projection 114 and a second recess 116 bent a plurality of times in the left-right direction of the seat 10 from the second linear portion 112 and formed alternately to each other.

The second projection 114 and the second recess 116 may be formed in a plural number extending from the front of the seat 10 to the rear thereof.

The first linear portion 102 is disposed adjacent to the left side of the seat 10, and the second linear portion 112 is disposed adjacent to the right side of the seat 10. Moreover, the first projection 104 and the second recess 116 are disposed to face each other so that the first projection 104 is inserted into the second recess 116, and the first recess 106 and the second projection 114 are disposed to face each other so that the second projection 114 is inserted into the first recess 106.

[Fifth Exemplary Embodiment]

Figure 10:
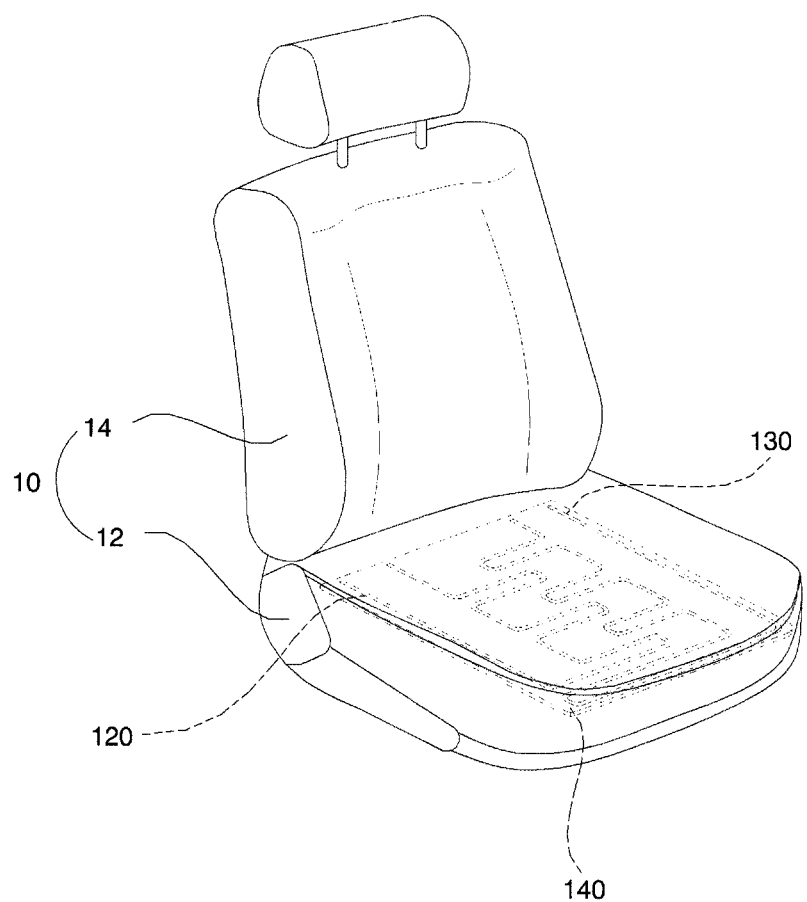
FIG. 10 is a view showing first and second electrodes of an occupant classifying device being installed in a seat according to a fifth exemplary embodiment of the present invention.

FIG. 10 is a view showing first and second electrodes of an occupant classifying device being installed in a seat according to a fifth exemplary embodiment of the present invention. Descriptions of the same parts as the foregoing exemplary embodiments will be omitted, and only the differences will be described.

Referring to FIG. 10, it can be seen that a first electrode 120 and a second electrode 130 of the occupant classifying device according to the fifth exemplary embodiment of the present invention are different from those of the foregoing exemplary embodiments.

That is, the first electrode 120 and the second electrode 130 are printed on a flexible printed circuit board 140. The shape of the first electrode 120 and second electrode 130 may be any one of the shapes of the foregoing exemplary embodiments.

As noted above, the flexible printed circuit board 140 having the first electrode 120 and the second electrode 130 printed thereon may be installed directly in the seat 10 or may be embedded in a sensor mat 50 and then installed in the seat 10.

The operation of the thus-configured occupant classifying device according to the present invention will be described below with reference to FIGS. 1 to 6.

First, when AC power is applied from the AC power system 42 to the first electrode 20, the first electrode 20 and the second electrode 30 alternately act as a positive (+) electrode and a negative (−) electrode to form an electric field between the first electrode 20 and the second electrode 30.

In this state, when the occupant 1 sits on the seat 10, the electric field changes as the occupant 1 comes into contact with the electric field, and a change in the current value I caused by the change in the electric field is measured by the current measuring device 44.

Thereafter, the control part 46 calculates the capacitance C between the first electrode 20 and the second electrode 30 by using the current value I measured by the current measuring device 44.

Then, the control part 46 compares the capacitance C between the first electrode 20 and the second electrode 30 calculated using the current value I measured by the current measuring device 44 with the capacitance values preset in the control part 46. That is, the control part 46 compares the capacitance C between the first electrode 20 and the second electrode 30 calculated using the current value I measured by the current measuring device 44 with the capacitance value obtained when the seat 10 is empty, the capacitance value obtained when a child restraint system (CRS) on which an infant under 1 year old is seated is mounted on the seat 10, the capacitance value obtained when a child sits on the seat 10, and the capacitance value obtained when a female representing the smallest 5% of the female population sits on the seat 10 with a cushion under her buttock, and the capacitance value obtained when a female representing the smallest 5% of the female population sits on the seat 10.

Next, if the capacitance C between the first electrode 20 and the second electrode 30 calculated using the current value I measured by the current measuring device 44 satisfies the capacitance value obtained when the seat 10 is empty, the control part 46 classifies the seat 10 as empty, if the capacitance C satisfies the capacitance value obtained when a child restraint system (CRS) on which an infant under 1 year old is seated is mounted on the seat 10, the control part 46 classifies the seat 10 as occupied by an infant, if the capacitance C satisfies the capacitance value obtained when a child sits on the seat 10, the control part 46 classifies the seat 10 as occupied by a child, if the capacitance satisfies the capacitance value obtained when a female representing the smallest 5% of the female population sits on the seat 10 with a cushion under her buttocks or the capacitance value obtained when a female representing the smallest 5% of the female population sits on the seat 10, the control part 46 classifies the seat 10 as occupied by a female representing the smallest 5% of the female population.

Afterwards, the control part 46 can control such that, if the seat 10 is classified as empty or the occupant 1 sitting on the seat 10 is classified as an infant under 1 year old, a child, or a female representing the smallest 5% of the female population, the airbag is not deployed or, even if deployed, the airbag may be deployed at low pressure.

While the preferred embodiments of the present invention have been shown and described, the present invention is not restricted by the specific embodiments. It is to be appreciated that those skilled in the art can modify the embodiments in various ways without departing from the scope and spirit of the present invention and the modified embodiments should not be construed individually from the technical spirit or prospect of the present invention.

What is claimed is:

1. An occupant classifying device comprising:
    a seat for an occupant to sit on;
    a first electrode disposed in the seat;
    a second electrode disposed in the seat, spaced apart from the first electrode, and forming an electric field between the first and second electrodes;

a current measuring device configured to measure a variation in a current value corresponding to changes in the electric field caused by the occupant sitting on the seat; and a control unit including the current measuring device configured to classify the occupant sitting on the seat based on the current value and a control part configured to classify the occupant sitting on the seat by comparing a capacitance calculated using the current value with capacitance values preset in the control part, wherein the capacitance values preset in the control part comprise:

a capacitance value obtained when the seat is empty;

a capacitance value obtained when a child restraint system on which an infant under 1 year old is seated is mounted on the seat;

a capacitance value obtained when a child sits on the seat:

a capacitance value obtained when a female representing the smallest 5% of the female population sits on the seat with a cushion under her buttocks; and a capacitance value obtained when a female representing the smallest 5% of the female population sits on the seat.

2. The occupant classifying device of claim 1, wherein the capacitance value obtained when the seat is empty is set to 0, a percentage of the capacitance value obtained when the child restraint system on which the infant under 1 year old is seated is mounted on the seat has a value of 5 or less, a percentage of the capacitance value obtained when the child sits on the seat has a value of 31 to 42, a percentage of the capacitance value obtained when the female representing the smallest 5% of the female population sits on the seat with the cushion under her buttocks has a value of 37 to 48, and a percentage of the capacitance value obtained when the female representing the smallest 5% of the female population sits on the seat has a value of 75 to 100.

3. The occupant classifying device of claim 2, wherein the capacitance values preset in the control part further comprising:

a capacitance value obtained when a mobile phone is on the seat;

a capacitance value obtained when the seat is wet with water;

a capacitance value obtained when the female representing the smallest 5% of the female population sits on the seat with a seat heater for heating the seat being disposed inside the seat; and a capacitance value obtained when the female representing the smallest 5% of the female population sits on the seat with the seat heater being disposed on the seat.

4. The occupant classifying device of claim 3, wherein a percentage of the capacitance value obtained when the mobile phone is on the seat has a value of 1 or less, a percentage of capacitance value obtained when the seat is wet with water has an approximate value of 37, a percentage of capacitance value obtained when the female representing the smallest 5% of the female population sits on the seat with the seat heater being disposed inside the seat has a value of 37 to 48, and a percentage of capacitance value obtained when the female representing the smallest 5% of the female population sits on the seat with the seat heater being disposed on the seat has a value of 75 to 100.

5. The occupant classifying device of claim 1, wherein the first and second electrodes are disposed on the same plane within the seat.

6. The occupant classifying device of claim 1, further comprising a sensor mat having the first and second electrodes embedded therein.

7. The occupant classifying device of claim 1, wherein the first electrode receives AC power and the second electrode is grounded to the automobile body.

8. The occupant classifying device of claim 1, wherein the first and second electrodes are made of a plate-like body.

9. The occupant classifying device of claim 8, wherein the first electrode is opened at one portion, and the second electrode is inserted into the opened portion.

10. The occupant classifying device of claim 1, wherein the first and second electrodes are made of wires.

11. The occupant classifying device of claim 10, wherein the first electrode comprises:

a plurality of horizontal portions spaced apart from each other and disposed in parallel to each other; and at least one bent portion connecting one side of the plurality of horizontal portions to a neighboring horizontal portion.

12. The occupant classifying device of claim 11, wherein the second electrode has the same shape as the first electrode and disposed along the first electrode.

13. The occupant classifying device of claim 10, wherein the center of the first electrode is bent so that both ends thereof are symmetrical to each other.

14. The occupant classifying device of claim 13, wherein the second electrode has the same shape as the first electrode and is disposed symmetrically to the first electrode.

15. The occupant classifying device of claim 10, wherein the first electrode comprises:

a first linear portion extending straight; and at least one first projection and first recess bent from the first linear portion and formed alternately to each other.

16. The occupant classifying device of claim 15, wherein the second electrode comprises:

a second linear portion extending straight; and at least one second projection and second recess bent from the second linear portion and formed alternately to each other.

17. The occupant classifying device of claim 16, wherein the first projection is inserted into the second recess, and the second projection is inserted into the first recess.

18. The occupant classifying device of claim 1, wherein the first electrode and the second electrode are printed on a flexible printed circuit board.

* * * * *